No. 628,821.  
A. LASCH.  
HOLLOW GLASS BLOCK.  
(Application filed Jan. 24, 1898.)  
Patented July 11, 1899.
(No Model.)
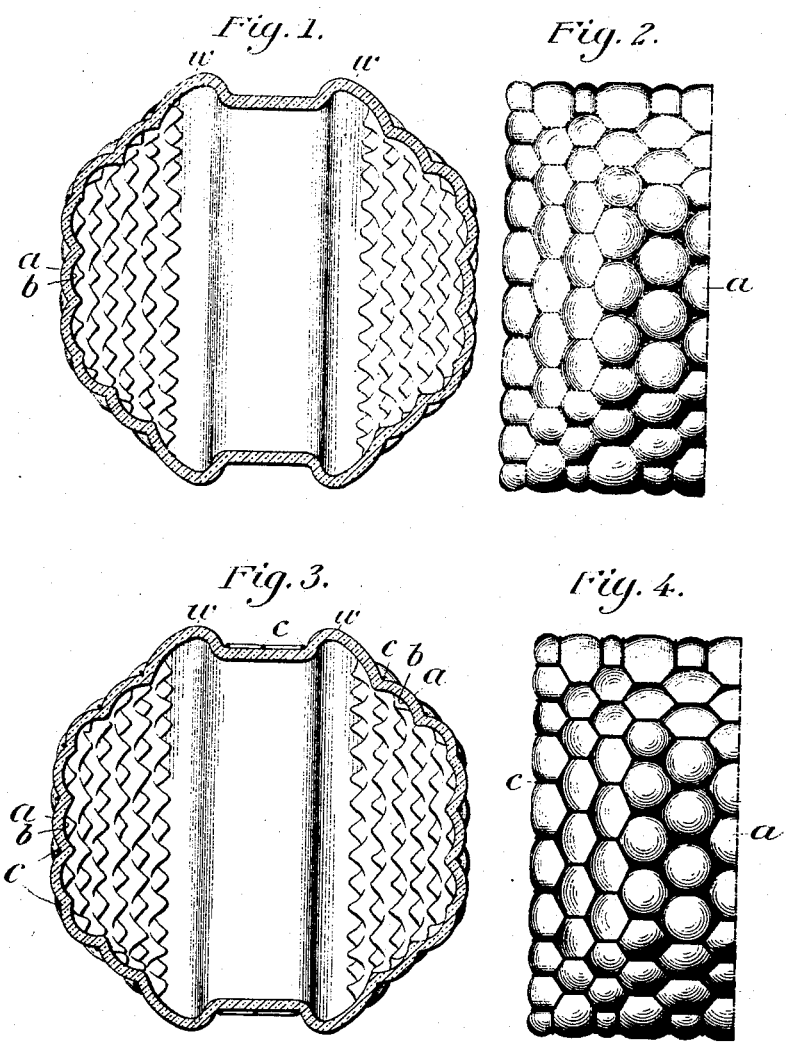
Witnesses.  
Theo. F. Snell.  
M. E. Barr.
Inventor.  
Albin Lasch  
by Arthur S. Browne,  
his attorney.

UNITED STATES PATENT OFFICE.

ALBIN LASCH, OF PENZIG, GERMANY.

HOLLOW GLASS BLOCK.

SPECIFICATION forming part of Letters Patent No. 628,821, dated July 11, 1899.

Application filed January 24, 1898. Serial No. 667,810. (No model.)

*To all whom it may concern:*

Be it known that I, ALBIN LASCH, a subject of the Emperor of Germany, residing at Penzig, in the Empire of Germany, have invented certain new and useful Improvements in Hollow Glass Blocks for the Construction of Walls Pervious to Light, of which the following is a specification.

In cases where the rules of the local or other authorities or other powers for regulating buildings do not permit windows to be provided in certain outer walls of buildings and where, nevertheless, daylight is necessary for illuminating the space behind such walls it has latterly been the practice to make portions of such walls with surfaces pervious to light. For this purpose hollow blocks of glass are used and put together and united by mortar or cement in the same manner as are bricks or stones. Walls so made from glass bricks lose considerably in their illuminating capacity by reason of the mortar passing through the same between the blocks and forming an opaque reticulation, and this is especially felt where the light impinges on the wall chiefly in oblique direction, as in that case the shadow thrown by the band of mortar is particularly broad. Besides this defect, another has been experienced with glass bricks—namely, that if one or more of the glass bricks forming a surface pervious to light break the fragments tumble out and leave a hole in what should be a solid surface. Apart from the fact that such fragments in falling may cause damage an aperture so caused in the wall may prove dangerous to the building, say, in case of fire, as the flames might find access through such hole. To obviate these two defects, the following two improvements shown in the accompanying drawings have been made in such blocks, which are hereinafter called "glass bricks."

Figure 1 is a section of a hollow glass brick, showing the formation of its surface. Fig. 2 is a front elevation of the same. Figs. 3 and 4 are respectively a section and elevation showing the wire network.

The glass bricks are made not only square, but also in any appropriate and convenient rectangular shape.

To make a wall pervious to light, whole bricks and half-bricks of this kind are joined together, so as to make the projections $w$ (shown in Fig. 1) meet. The space remaining between the latter is filled with mortar or cement, so as to unite the bricks.

The object of the present improvement in glass bricks is that the mortar may not interfere with the illumination of the space intended to be lighted.

It consists in providing on the outer surface of the glass bricks lens-like projections $a$, as shown by the sectional view, Fig. 1, with which correspond lens-like depressions $b$ in the interior. Consequently these surfaces consist, as it were, of a number of contiguous concavo-convex optical lenses, the bounding-lines of each of which form a hexagon, as illustrated in Fig. 2. These lenses facing the space to be illuminated disperse the light impinging upon them, and these neutralize the shadow thrown by the mortar. In order to prevent the falling out of the fragments should such a glass brick break, whereby a hole would be left, it is further improved by being surrounded by a network $c$ of wire, which lies in the depressions between the lenses $a$ at front and back, as shown in Figs. 3 and 4. This wire network presents the additional advantage of giving better hold to the mortar at the sides.

These improvements in glass bricks may be adopted together or singly, as may be convenient.

What I claim, and desire to secure by Letters Patent of the United States, is—

1. A hollow block or brick of glass for making walls pervious to light having a compact multiplicity of contiguous concavo-convex lenses $a$, $b$, formed in both external faces so as to break up and disperse the light passing through the one set into the other set and out of the block into a number of pencils or rays for the purpose of neutralizing or lessening the lines or shadows otherwise produced by the cement or other opaque material placed between contiguous blocks.

2. A hollow block or brick of glass for making walls pervious to light having lenses formed in its faces, and a wire-netting surrounding it, the meshes of such netting corresponding with the size and shape of the lenses and so fitted that the wires lie in the bottom of the channels or depressions between the lenses and below or within the level of the general or average external surface of the block, for the purpose of preventing, in case of breakage, the falling out of the fragments of the block.

In testimony whereof I have hereunto set my hand in the presence of two witnesses.

ALBIN LASCH.

Witnesses:
ALBERT MAYER,
BRŬM FRUSCHER.